United States Patent [19]

Weil

[11] Patent Number: 4,823,656

[45] Date of Patent: Apr. 25, 1989

[54] TOOL HOLDING ASSEMBLY FOR A LATHE TURRET

[76] Inventor: Albert G. Weil, 419 Wilton Ave., Palo Alto, Calif. 94306

[21] Appl. No.: 929,401

[22] Filed: Nov. 10, 1986

Related U.S. Application Data

[63] Continuation-in-part of Ser. No. 711,970, Mar. 14, 1985, abandoned.

[51] Int. Cl.$^4$ .................... B23B 29/28; B23B 29/32
[52] U.S. Cl. ........................................ 82/159; 82/160; 82/161
[58] Field of Search ................... 82/36 R, 36 A, 36 B, 82/37; 29/35.5, 39, 41, 52, 57

[56] References Cited

U.S. PATENT DOCUMENTS

| | | | |
|---|---|---|---|
| 946,924 | 1/1910 | Thompson | 29/35.5 |
| 950,329 | 2/1910 | Hillenbrand | 82/37 |
| 2,171,802 | 9/1939 | Nielsen | 82/36 R |
| 2,708,583 | 5/1955 | Todd | 279/6 |
| 2,878,705 | 3/1959 | Hirvonen | 82/36 B |
| 3,107,562 | 10/1963 | Miller | 82/36 R |
| 3,298,091 | 1/1967 | Bowman | 82/36 R |
| 3,359,840 | 12/1967 | Soleau | 82/36 R |
| 3,425,305 | 2/1969 | Cocco | 82/37 |
| 3,490,318 | 1/1970 | Jones | 29/35.5 |
| 3,628,404 | 12/1971 | Riley | 82/36 A |
| 3,662,632 | 5/1972 | Riley | 29/57 |
| 4,164,880 | 8/1979 | Di Marco | 82/36 R |
| 4,308,771 | 1/1982 | Windle | 29/52 |

FOREIGN PATENT DOCUMENTS

| | | | |
|---|---|---|---|
| 1813142 | 6/1970 | Fed. Rep. of Germany | 82/36 A |
| 9607 | 1/1985 | Japan | 82/36 A |

OTHER PUBLICATIONS

Advertising Brochure entitled "Hardinge Super-Precision Chucking Machines", Bulletin HC, Hardinge Brothers, Inc.

Advertising Brochure entitled "Hardinge Tools and Tool Holders", Hardinge Brothers, Inc., 1980.

Primary Examiner—Frederick R. Schmidt
Assistant Examiner—William E. Terrell
Attorney, Agent, or Firm—Cushman, Darby & Cushman

[57] ABSTRACT

A tool holding assembly, for use with a multi-station turret of a lathe or chucking machine, that allows the positioning of tools to be automatically reestablished when a previously removed tool is to be remounted. In a retrofitting embodiment, the tool holder is comprised of a base unit that will be fixed to the turret and at least one separate tool holding member removably attached to that base unit. The base unit will be secured at a precise and fixed location on the turret top plate and to effect a tool change, only the tool holding member will be removed from the base unit. In one exemplary embodiment, the base unit has a machined slot or groove in the front surface thereof and each tool holding member has a mating machined tongue that will cooperate to limit or prevent relative horizontal movement yet permit relative vertical movement therebetween. A separate vertical positioning mechanism will set and maintain the relative vertical positioning. A tool and its tool holding member when mounted to a base unit, will be automatically positioned horizontally and vertically. The turret top plate can also be integrally formed with a plurality of exposed mounting faces, as on individual base units, with the tool holding members then being mounted directly to the turret.

2 Claims, 6 Drawing Sheets

TOOL HOLDING ASSEMBLY FOR A LATHE TURRET

This is a continuation-in-part of application Ser. No. 06/711,970, filed March 14, 1985 abandoned.

FIELD OF THE INVENTION

The present invention relates to removable and automatically realignable tool holders for use with various types of machine tools and in particular with multi-tool turrets used thereon to permit a plurality of tools to be readily accessible.

BACKGROUND OF THE PRESENT INVENTION

Multi-station turrets are used on chucking, lathe or other types of machining equipment that can perform turning, facing, boring, threading or other similar machining operations. Such turrets provide a multiple number of tools, one at each station or position that will allow increased production since tools will not have to be changed as frequently. Turrets can be automatically or manually indexed from station to station to sequentially position the next and different tool at the next desired location on a work piece Such turrets are also variously indexable on various types of movable carriage structures. For purposes of this invention, turret operation is assumed to be conventional With reference to FIGS. 1, 2 and 3, a typical turret is shown together with known types of tool mounting mechanisms. Such tool mounting elements are required since it is still necessary to change tools on a turret. Heretofore, this change from one tool to another, required as much set up time as when the first set of tools was put into place on the turret and then adjusted to the desired position.

Figure 1:
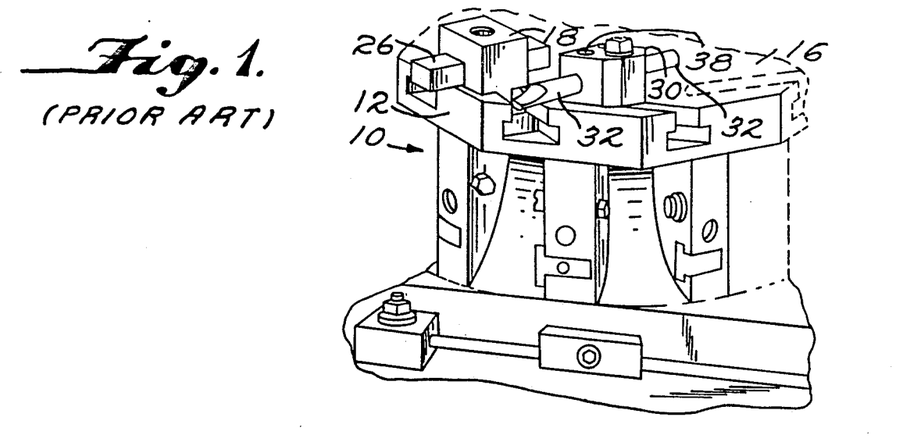
FIG. 1 is a representation of a portion of a known form of a turret showing two different tool holding members mounted, thereto.
Figures 2, 3:
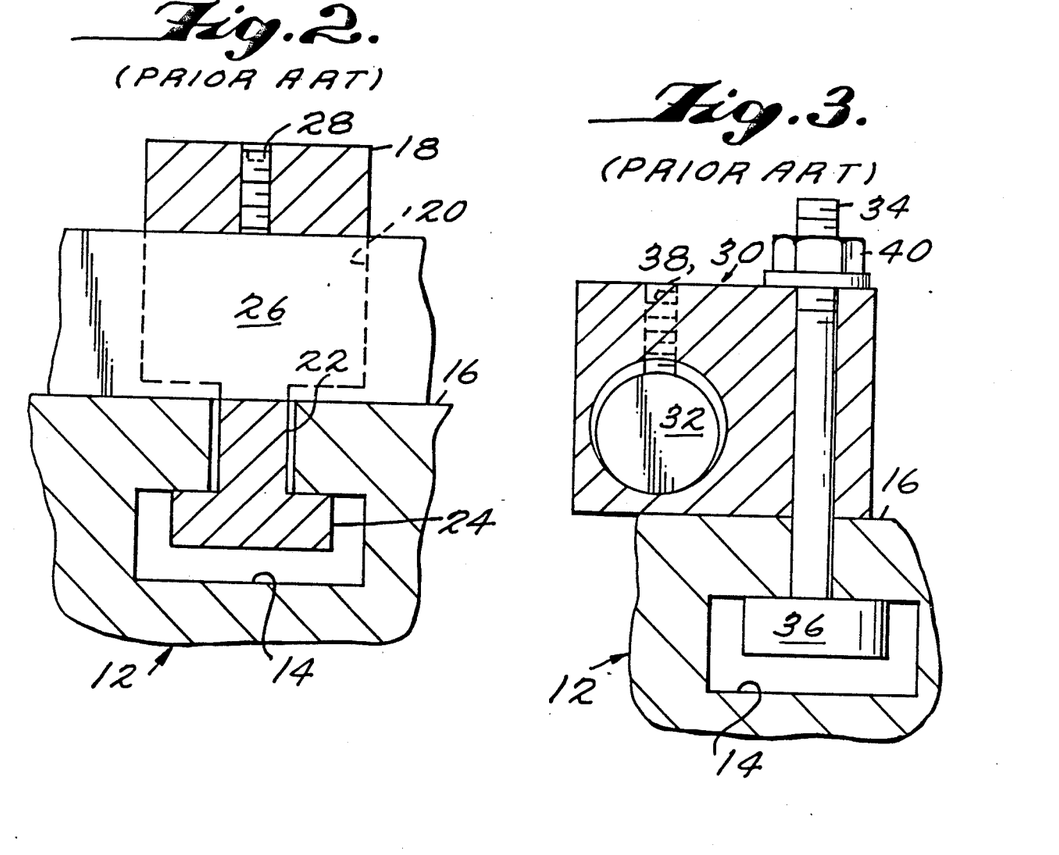
FIG. 2 is a view of a conventional tool holder similar to one of those shown in FIG. 1.
FIG. 3 is a view of a conventional tool holder similar to one of those shown in FIG. 1.

A conventional multi-station turret is generally indicated at 10 and is comprised of a turret top plate 12 with a plurality of inverted T-shaped slots 14 which have been milled at a defined angle into the upper part of plate 12 so as to extend upwardly through the upper surface 16. These slots generally take the form of an inverted T so that the inwardly directed flanges created will hold a tool holder 18. In many conventional versions, eight such tool holders can be mounted in position on the turret top plate as tool holders 18 and 30 are in FIG. 1. The two exemplary tool holders 18 and 30 are shown in FIGS. 2 and 3. The tool holder in FIG. 2, shown at 18, is provided with a top portion that includes a through slot 20 for receiving a single tool 26, a recessed portion 22 that will fit between the inwardly directed flanges of the T-slot and an enlarged shoe portion 24 that fits between those flanges as shown. The reduced portion 22 and shoe 24 will slip within slot 14 and as shown in FIG. 1, with tool 26 in place within slot 20 when set screw 28 is screwed down onto tool 26, the latter will be forced into contact with upper surface 16 of the turret top plate 12. Continued downward movement of set screw 28 will force the upper flange surfaces of shoe 24 to mate with the complementary portion of the lower surfaces of the slot 14 flanges. Accordingly, screw 28 simultaneously holds tool 26 in place and locks the tool mounting member 18 in place on the turret top plate 12.

In order to accurately position the tool holder or mounting member 18, set screw 28 would be loosened so that member 18 is slidable horizontally along surface 16 back and forth within the slot until the operator is assured the tool holder is correctly positioned horizontally along the length of slot 14. To adjust the vertical height of the tool, which would otherwise rest on surface 16 of the turret top plate, appropriate shims can be placed beneath tool 26 thereby lifting the tool with respect to surface 16. Once the tool holder is positioned both horizontally and vertically, or once all such tools were positioned at each station, it would be normal for the operator to conduct a trial run to be sure each of the various tools were correctly positioned and that no minor alterations were required. If alterations were needed, they would then be made, to assure the proper positioning of the tool to effect the proper operation before production use started.

FIG. 3 shows a second type of conventional tool holder, 30, for holding a boring tool 32. Rather than having a defined foot, as shown in FIG. 2 at 24, to fit within slot 14, tool holder 30 employs a bolt 34 that has a suitably shaped head 36 designed to fit within slot 14. Boring tool 32 is held in tool holder 30 by means of set screws 38. In order to position tool holder 30 with respect to turret top plate 12, head 36 would be slid into slot 14 and with the holder 30 resting on surface 16 and after appropriate positioning horizontally or with the use of shims to adjust the vertical height of tool holder 30, if necessary, bolt 40 would then be tightened thus securing head 36 within slot 14 and holding holder 30 therebetween.

To remove tool holders 18 or 30, as shown in FIGS. 2 and 3, set screw 28 or nut 40 are loosened, respectively, which will allow the tool holder to be removed. However, once removed, repositioning of another tool or even that same tool holder back into position, would again require repeating the adjustment steps just discussed above together with additional trials by the operator to assure the new or repositioned tool holder was positioned in the desired location, both horizontally and vertically.

To shift to a different tool holder would, of course, require the same sort of initial set up techniques discussed above for tool holders 18 and 30, this being true regardless of the type of tool holder involved and whether is held double or triple tools, other types of drilling devices or boring tools.

SUMMARY OF THE PRESENT INVENTION

The primary objective of the present invention, then, is to provide a modification of this tool holder mounting concept so that, on the one hand, tools can be exchanged within any or all of the eight stations provided on the turret, or for that matter, from one turret station to another The mounting process is rendered far more rapid and accurate, so that new tools can be placed onto the turret in a manner that will assure the exact positioning of that tool once that position is established.

Figure 18:
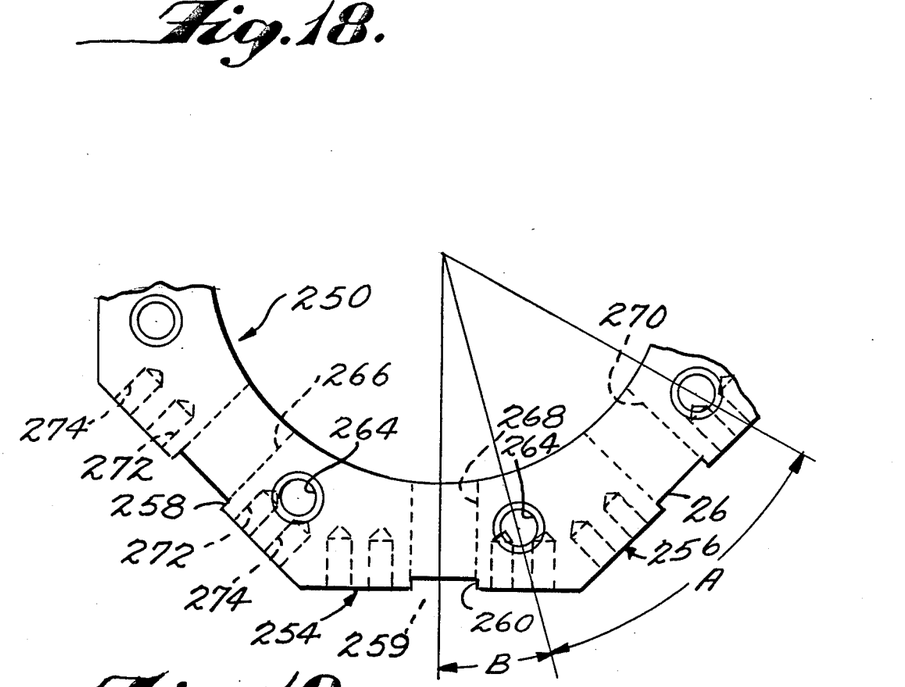
FIG. 18 is a partial, top, plan view of a one-piece base unit according to the present invention.
Figure 19:
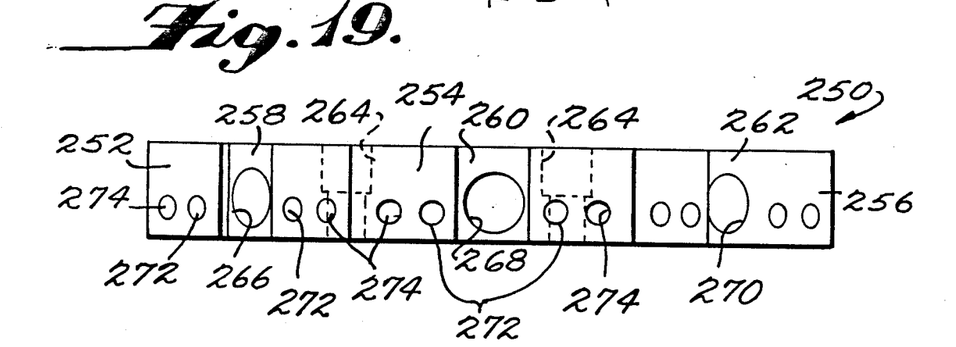
FIG. 19 is a front elevational view of the base unit shown in FIG. 18.

With the present invention, when initially mounting tools on the turret at the beginning of a project, it should be understood that the tools will have to be properly positioned. However, once that initial mounting is accomplished, tools can thereafter be added to or removed from the turret without having to go through the same realigning steps as previously required and discussed above. The present invention can be used both with conventional turrets, as shown in FIG. 1, by using a retrofit arrangement or alternatively, the turret can be replaced with a new turret, for example as shown in FIGS. 18 and 19.

The retrofit embodiment is comprised of a tool holding assembly including a base unit or member and a tool holding member. While the base unit can take one of several forms, it will, however, be securely fixed to the top of the turret top plate 12, preferably by being bolted into place or secured by any convenient means. The other portion of the tool holding assembly is comprised of a removable tool holding member that is removably attached to the base unit.

In one exemplary form, the base unit is a separate member sized to be similar in dimensions to the tool holding member and provided on its front, outwardly facing surface with a vertically extending groove. The tool holding member is provided with a complementary vertically extending tongue that projects rearwardly from its rear face. Thus, when the tool holding member is positioned correctly on the base unit, the groove and tongue members mesh together. This guarantees the correct horizontal positioning of the tool holder on the base unit.

This arrangement allows vertical movement, but limits or prohibits relative horizontal movement between a base unit and the tool holding member. Accordingly, it constitutes a means for fixing the horizontal positioning of the base unit relative to the tool holding member. However, this means for fixing the relative horizontal positioning can take other forms. For example, the tongue could be provided on the base unit and the groove on the tool holding member. Alternatively, the tool holding member could have its sides extend rearwardly to fit over the base unit or vice versa. There could be multiple tongue and grooves, an arrangement of pins and receiving holes could be used, or any other sort of complementary arrangement that would permit relative vertical movement while restricting, limiting or preventing relative horizontal movement.

The tool holding member also includes a rearwardly extending member in which a vertical adjustment device, in the form of a set screw and nut, is arranged. This vertical adjustment device overlies and is preferably secured to the top surface of the tool holding member so that when the horizontal positioning means are engaged, the bottom of the vertical adjustment set screw will overlie and butt against the top of the base unit. When it does so, the tool holding member will be in the desired and correct vertical position relative to the base unit. At that point, the tool and its tool holding member will be properly positioned and can be bolted in place to the base unit.

The base unit can also be formed as a solid one-piece member with a plurality of front surfaces formed together with the desired horizontal positioning arrangement. The tool holding members would then be mounted directly to each front surface in the same way as discussed for the individual base unit.

In a new turret construction, the turret top plate could be formed as that single, one piece base unit so that the one piece base unit design would be made an integral part of the turret.

Other objects, features, and characteristics of the present invention, as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS OF THE PRESENT INVENTION

As explained above, FIGS. 1-3 show prior art tool holding devices mounted to a conventional turret assembly and are representative of those offered by Hardinge Brothers, Inc. for use with chucking machines.

Figure 4:
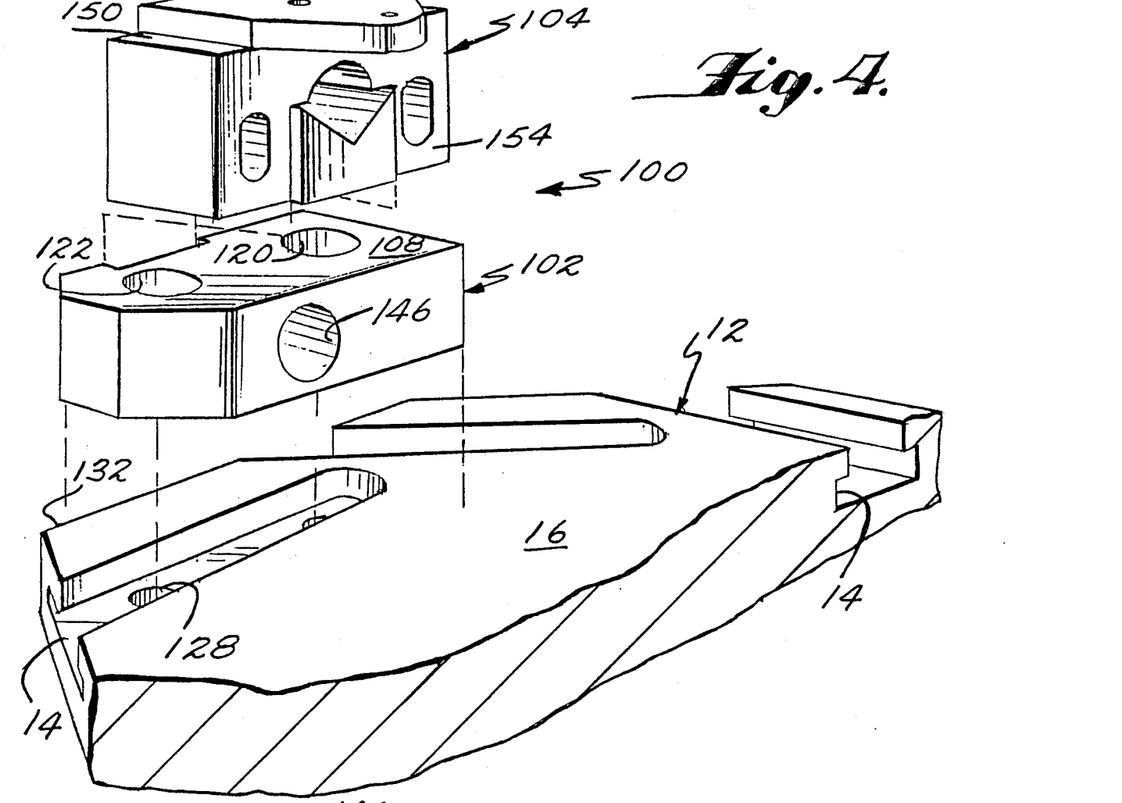
FIG. 4 shows an exploded perspective view of a portion of a conventional turret top plate and the base unit and the tool holding member according to the present invention.
Figures 11, 12:
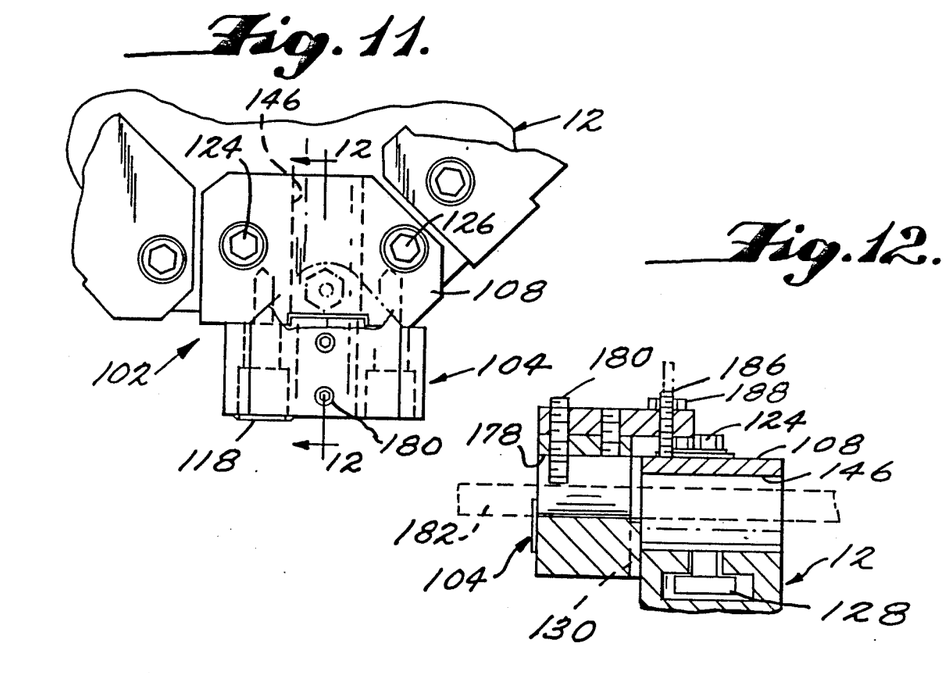
FIG. 11 is a top plan view of a conventional turret top plate on which several base units and one tool holding member are mounted.
FIG. 12 is a cross-sectional view taken along line 12—12 in FIG. 11.

With reference to FIG. 4, the tool mounting assembly according to the present invention is generally indicated at 100, and is comprised of a base unit, generally indicated at 102 and a tool mounting member, generally indicated at 104. Base unit 102 is specifically shown in FIGS. 5, 6 and 7 whereas the tool holding member 104 is shown in FIGS. 8, 9 and 10. In FIGS. 11 and 12 there are top plan and cross-sectional views, respectively, of the base unit 102 and tool holding member 104 mounted in position on a turret top plate 12.

Turning to FIGS. 4–7, base unit 102 is comprised of a block of material having at least a front face 106, a top face 108 and a bottom face 110.

Front face 106 includes a vertically extending, shallow groove, indicated at 112 and horizontally extending threaded apertures 114 and 116 to receive a bolt, indicated at 118 in FIG. 11, for holding a tool holding member 104 to that base unit.

The upper surface 108 includes two separate apertures 120 and 122 for receiving bolts 124 and 126, as shown in FIG. 11, for mounting the base unit itself to the turret top plate 12, by having their heads 128 mate with the inwardly directed flanges of slots 14. Alternatively, some other arrangement for fixing a base unit could also be employed. This is also shown in FIG. 12.

The front face 106 of base unit 102 extends below its bottom surface 110 thereby forming an overhanging or aligning lip 130 which, as shown in FIG. 12, will fit over and engage the front outer corner or edge 132 of the turret top plate 12 so as to aid in the proper aligning of the base unit 102 with that turret top plate.

Figure 5:
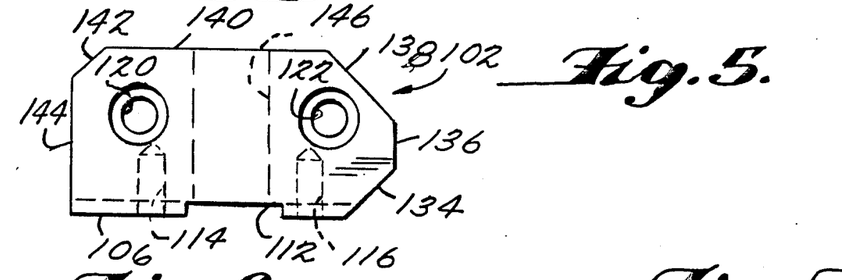
FIG. 5 is a top, plan view of the base unit as shown in FIG. 4.
Figure 6:
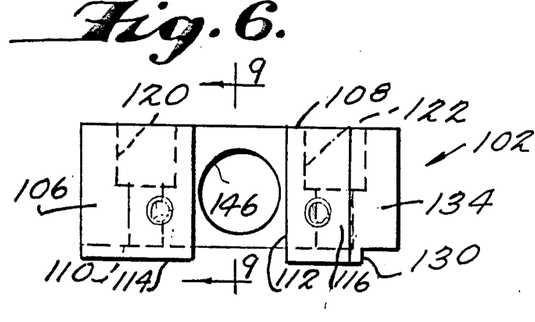
FIG. 6 is a front, elevational view of the base unit shown in FIGS. 4 and 5.
Figure 7:
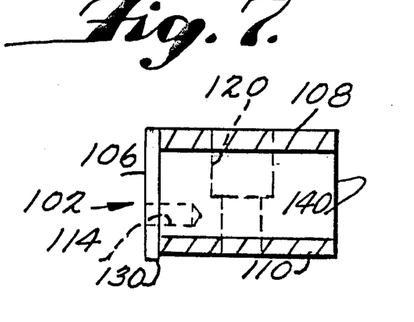
FIG. 7 is a cross-sectional view taken along line 7—7 in FIG. 6.
Figures 8, 9, 10:
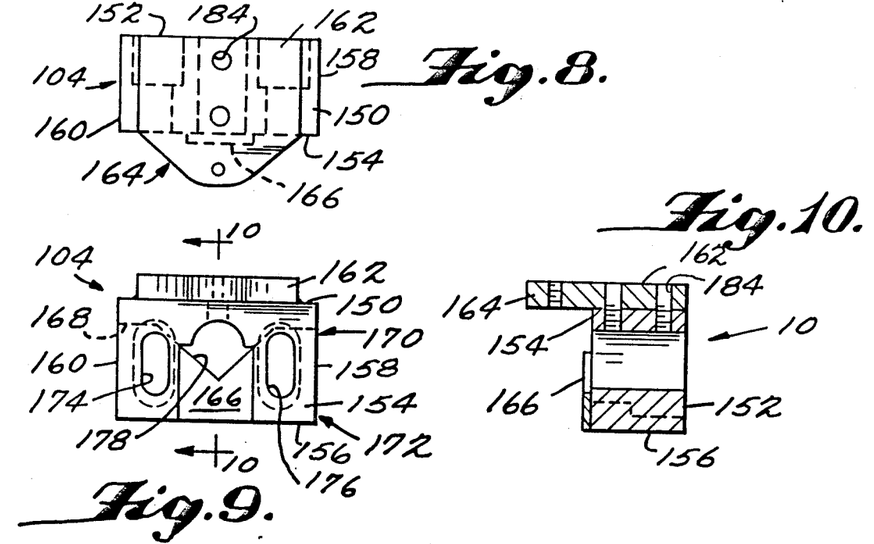
FIG. 8 is a top, plan view of the tool holding member as shown in FIG. 4.
FIG. 9 is a front elevational view of the tool holding member shown in FIGS. 4 and 8.
FIG. 10 is across-sectional view taken along line 10—10 in FIG. 9.

While base unit 102, as shown in FIGS. 5–7, includes a number of shaped side surfaces, as indicated at 134–144, these, in fact, are provided to accommodate adjacent base units 102 as indicated in FIG. 11 on this style turret top plate. Depending upon the number of tool mounting assemblies that can be supported on a multi-station turret 10, and depending upon the shape of that turret top plate, the overall shape and configuration of base units 102 can be varied to accommodate such changes. What is important, is that the base unit itself be mountable to the turret top plate and that it include a mechanism for meshing with a separate tool holding member to fix the relative horizontal position therebetween. Base unit 102 also includes a through bore 146 to receive, in a non-gripping fashion, any portion of a tool that might extend beyond the tool holding member as, for example, is shown in FIG. 12 for the tool shown in phantom at 182. The aperture 146 is shown as being centrally positioned on the base unit and relative to slot 112 as well. It is only important, however, that this aperture 146 align with a sufficient amount of any tool holding aperture in the tool holding member to itself receive that portion of the tool extending beyond the tool holding member when the two are positioned together.

Turning now to FIGS. 8–10, but with additional reference to FIGS. 4, 11 and 12 as needed, tool holding member 104 is comprised of a top surface 150, front and rear surfaces, respectively indicated at 152 and 154, a bottom surface 156, and side surfaces 158 and 160.

A separate plate member, indicated at 162, is welded or otherwise fixed to the top surface 150 of tool holding member 104 and, as shown in FIGS. 8 and 10, plate 162 extends outwardly past rear wall 154. That overhanging portion is generally indicated at 164. Rear surface 154 is also provided with an outwardly extending tongue 166 which can be either machined from the material from which member 104 is formed or can be separately welded in place. As previously discussed, tongue 166 is merely exemplary of the form of a mechanism that will allow the tool holding member to be mated with a base unit so that relative horizontal motion is fixed while permitting relative vertical movement.

As can be seen, groove 112, into which tongue 166 is matingly received, has vertical sides with faces which are normal to the connecting member surface between the side faces. It will be appreciated that so long as the angles formed between the side faces and member surface of the groove total at least 180 degrees, tongue 166 can be placed directly into groove 112 by moving tool holding member 104 in a horizontal direction relative to base unit 102. It is preferable that each such angle be 90 degrees or more in order for the tool holding member to be placed in engagement with the base unit with the rear surface 154 of the tool holding member parallel to the front face 106 of the base unit.

It might be noted, with reference specifically to FIG. 9, that tool holding member 04 can be formed from two shaped members that are individually cast or machined. The dividing line between those members is indicated at 168, while the two members are indicated at 170 and 172. Alternately, tool holding member 104 could be formed from a solid block of material and appropriately machined into the desired or required shape.

Tool holding member 104 is provided with a plurality of apertures. A pair of apertures in the form of elongated, vertically positioned slots, 174 and 176, extend horizontally from front to rear through the tool holding member to provide mounting slots to mount the tool holding member to a base unit 102. Slots 174 and 176 are preferably oval in shape, as shown in FIG. 9, and the vertical positioning allows form some vertical movement relative to the base unit. A central tool holding aperture 178 is also provided and it is through this aperture that a tool can be placed and retained, as for example, by set screws 180. A tool 182 is indicated in phantom in FIGS. 11 and 12 and one such set screw 180 is shown holding that tool in place against the bottom of aperture 178. Aperture 78 extends through the tool holding member and can have a variety of forms or shapes, depending upon the shape of a tool to be received therein, and the method of securing the tool in place.

Set screws 180 will operate within apertures 184 which extend from the top of plate 162 down through the upper portion of tool holding member 104 so as to enter into aperture 178.

Portion 164 of plate 162 includes an aperture 184 to receive a set screw 186 which can be adjustably retained in place by means of a nut 188. As shown in FIGS. 11 and 12, when the tool holding assembly 100 is fixed together, tool holding member 104 will mate with and be connected to base unit 102 by bolts 118 which operate within apertures 174 and 176. In this condition, tongue 166 will fit within and mesh with groove 112 thereby establishing the proper horizontal positioning between base unit 102 and tool holding member 104. Relative vertical movement therebetween is allowed and since the extension portion 164 of the tool holding member extends over the upper surface 108 of the base unit, set screw 186 will determine the extent to which the tool holding member can move downwardly toward the base unit. Once set screw 186 is fixed to adjust the desired vertical height of the relative position between members 104 and 102, thereby establishing the proper relative vertical positioning of tool 182, that relative vertical position will be fixed and maintained. Thereafter, should that tool holding member be removed from that base unit, it can be repositioned on that base unit or another base unit precisely in the same vertical and horizontal relationship as initially established. For example, that is when tongue 166 fits within groove 112 and the bottom of set screw 186 engages the upper surface 108 of the base unit, tool holding member 104 will again be properly positioned, both horizontally and vertically with respect not only to base member 102, but also with the turret top plate and the workpiece.

It should be understood that when changing tools, each tool, such as indicated at 182, will remain fixed to its particular tool holding member. To remove or change a tool, the tool holding member is removed. When another tool is placed on the turret, a separate tool holding member appropriately designed to receive that particular tool and having its own vertical adjustment for that tool, will be mounted to that base unit. In this way, each separate tool holding member can be precisely adjusted so that it will properly align that tool which it holds with the turret and the workpiece.

Accordingly, when one wishes to change tools, bolts 118 will be removed, tool holder 104 will be removed, a new tool holder member 104 will be set in place and bolts 118 replaced Thereafter, no further adjustments will be necessary and work can continue with that new tool.

Figures 13, 15:
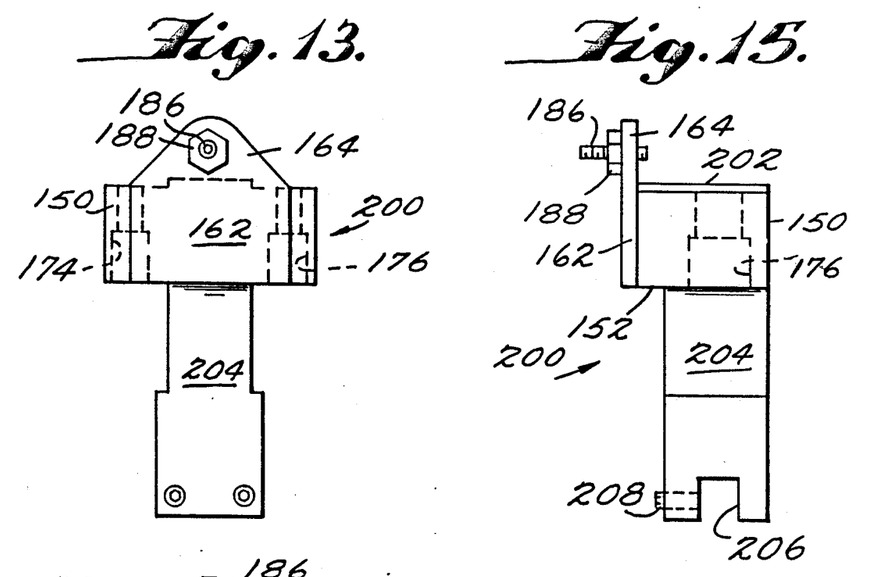
FIG. 13 is a top plan view of a second embodiment for a tool holding member according to the present invention.
FIG. 15 is a side, elevational view of a tool holding member shown in FIG. 13.
Figures 14, 16:
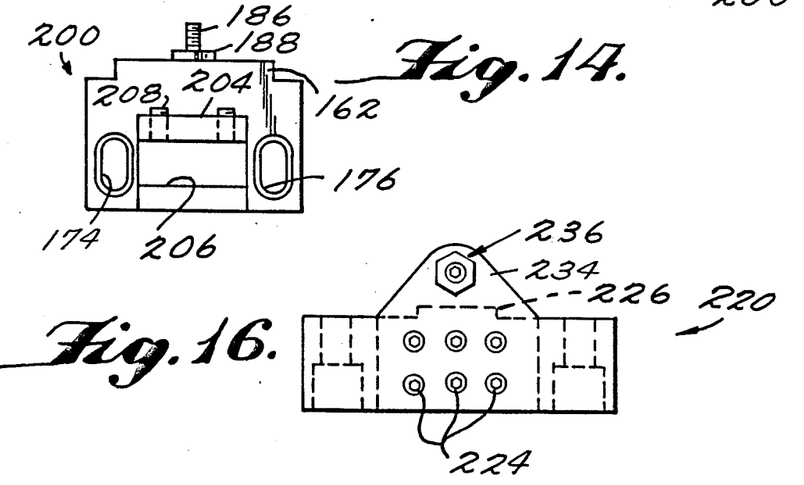
FIG. 14 is a front elevational view of the tool holding member, shown in FIG. 13.
FIG. 16 is a top plan view of another embodiment of a tool holder according to the present invention.

The present invention can work with a number of different types of tool holding members, one of which is shown in FIGS. 5–7. Another tool holding member is shown in FIGS. 13–15. Not all tools will have to extend through the tool holding member, so rather than employing the block member from which tool holding member 104 is formed, tool holding member 200 in FIG. 13 includes a tool holding member that is solid and incorporates a tool holding extension 200. The major portion of the rear part is similar to that indicated for member 104 except that tongue 202 now extends from the bottom surface 156 along the entire rear surface and terminates at the bottom of plate 162. The front extension member 204 is welded or otherwise fixed to the front face 152 and includes a slot 206 which extends across the front face thereof for purposes of holding a tool that would extend parallel to face 152. The tool would be held in slot 206, for example, by set screws 208 provided in suitable apertures within that slot portion as shown.

Extension member 204 by itself is substantially similar to one type of tool holder that is currently used with turret tooling and would be used for turning or boring large diameter parts or for back facing flanged work. Generally, such a tool holder will take square bits, but they are certainly not limited to that shape While this extension portion itself is similar to extension members used in the art, its attachment and combination with the rear portion of the tool holding member, according to this invention, as shown, provides a novel way to again allow for quick changing of various types of tools, with the front portion 204 being exemplary of the way individual tools can be mounted to my tool holding member to accommodate machining needs.

Figure 17:
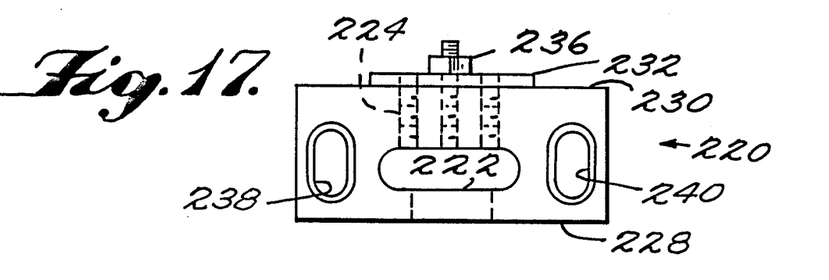
FIG. 17 is a front elevational view of the tool holder shown in FIG. 16.

Turning now to FIGS. 16 and 17, still another embodiment of a tool holder according to my present invention is set forth It is generally indicated at 220 and unlike aperture 178 in the tool holding member shown in FIGS. 8–10 this embodiment employs an enlarged central slot 222 that extends through the entire tool holding member. By having this slot extend across about 40% of the width of the tool holding member 220 and by shaping it in this manner, a number of different or differently shaped bits or tools can be retained by use of the plurality of set screws 224 For example, square bits or a type of tool that had a square rear portion could fit into that slot and be retained in place. Preferably, tongue 226 extends from the bottom surface 228 to the top surface 230. Plate member 232 welded to the top surface 230 is similar to plate 162 in that it contains a rear extension portion 234 to accommodate a set screw and nut assembly, generally indicated at 236, to again provide adjustability in vertical positioning the tool holding member 220 on a base unit. The tool holding unit 220 also includes mounting apertures 238 and 240 which will allow the tool holding member 220 to be mounted to and to permit, initially, some relative vertical movement with a base unit.

With reference now to FIGS. 18 and 19, rather than employing a plurality of separate, individual base units 102 to retrofit an existing turret, it is also possible, and perhaps an occasion preferable, to construct a single one-piece base member 250 that would form the same function as a plurality of base units 102. This one-piece base unit would be mounted on a turret top plate through use of suitable bolts (not shown) and vertical apertures 264 which are spaced apart about member 250 that will cooperate with slots 14. This one-piece member 250 is provided with a plurality of front faces, three of which are indicated at 252, 254 and 256. These front faces respectively include separate slots as indicated at 258, 260 and 262, or a tongue, as shown in phantom at 259 if the tool holding member contained a mating slot, as well as separated pairs of apertures for receiving mounting bolts 118, the pairs being indicated at 272 and 274. Tool receiving bores are also provided at 266, 268 and 270. Accordingly, the one piece unit 250 could be placed on an existing turret top plate in order to accommodate a plurality of tool holding members 104.

It should also be understood, that the turret could be constructed with its top plate formed in a manner similar to that shown for the one piece structure in FIG. 18 at 250.

The base units and tool holding members are preferably constructed from heat treated, hardened or case hardened steel, hardened for example, 0.02 inches deep and to 45–60 RC. However, other machinable, hard materials could be used including aluminum, various alloys thereof, or tough, resilient, high impact resistant polymeric resins, advantageously any one of the known thermosetting plastic resins characterized by such properties.

While dimensions may vary, exemplary dimensions for the base unit 102 would include a width of about 2.5 inches, a height of about 1.0 inches, and a thickness of about 1.25 inches. Apertures 120 and 122 could be spaced apart about 1.5 inches (on center) with apertures 114 and 116 being spaced about 1.312 inches apart (on center). Groove 112 could be about 0.7510 inches±0.0005 with lip 130 extending about 0.090 inches below bottom surface 110.

The tool holding member 104 could be dimensioned so as to be about 2.0 inches wide, about 1.25 inches high, about 1.0 inches thick and plate 162 is about 0.25 inches thick and about 1.50 inches in length from front to rear. Apertures 174 and 176 could be spaced apart about 1.312 inches (on center) and tongue 166 about 0.749±0.0005 inches in width.

With respect to FIG. 18, base plate 250 could be about 7.190 inches in outer width, from surface 254 to its opposite surface, and slots or grooves 260 would be similarly dimensioned at about 0.7510±0.0005 inches and positioned about 45° apart from one another about the one piece base unit 250. It will be noted that adjacent each of the through bores, shown at 266, 268 and 270 are two sets of tool holding member mounting apertures, the inner pair 272 being spaced about 1.312 inches apart with the outer pair 274 being about 2.250 inches apart. Angle A is about 45° and angle B is about 15°.

Figure 20:
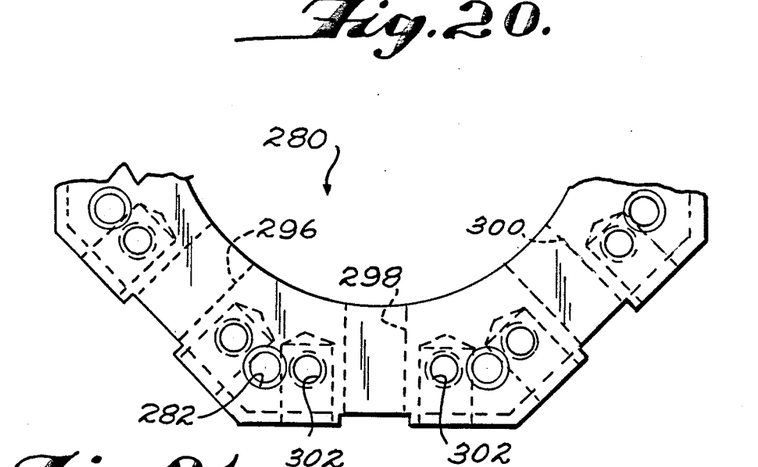
FIG. 20 is a partial top, plan view of a second one-piece base unit according to the present invention.
Figure 21:
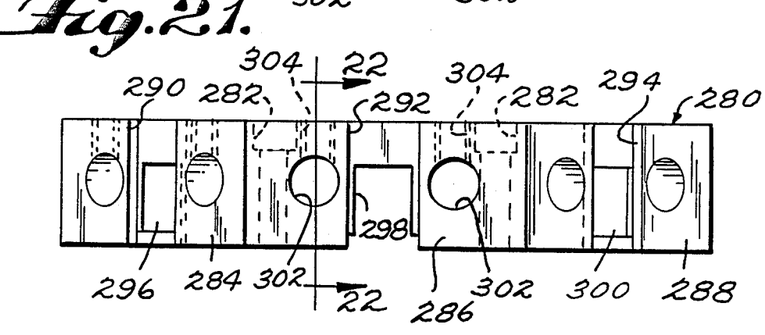
FIG. 21 is a front elevational view of the base unit shown in FIG. 20.
Figure 22:
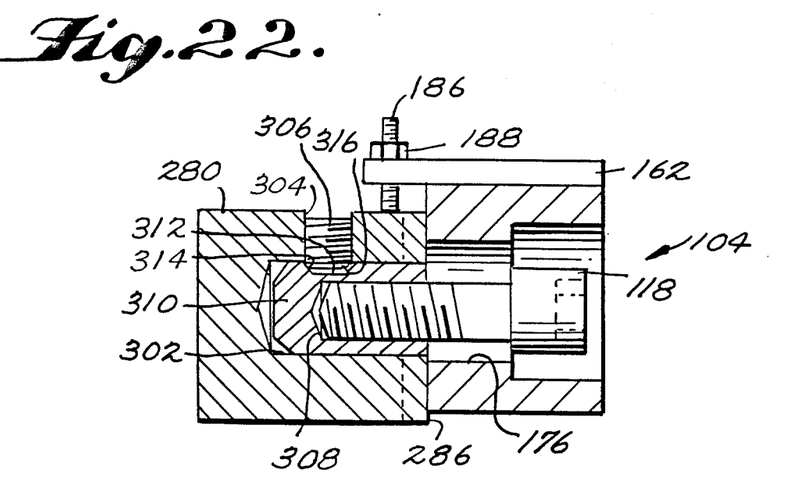
FIG. 22 is a cross-sectional view taken along line 22—22 in FIG. 21 and an associated tool holding member as shown in FIGS. 8-10.

Referring now to FIGS. 20-22, a single one-piece base member 280 similar to base member 250 is shown. This base unit is mounted on a turret top plate through use of suitable bolts (not shown) and vertical apertures 282 which are spaced apart about member 280 for cooperation with slots 14. One-piece member 280 is provided with a plurality of front faces, three of which are indicated at 284, 286 and 288. These front faces respectively include separate slots as indicated at 290, 292 and 294. Tool-receiving passageways 296, 298 and 300 are provided which correspond to the bores 266, 268 and 270 in member 250, described previously. It will be seen that base member 280 may be placed on an existing turret top plate in order to accommodate a plurality of tool holding members 104.

Instead of the separated pairs of apertures 272, 274 provided in member 250, base member 280 has a pair of mounting-pin-receiving bores 302 associated with each front face of the base member. Base member 280 also has a vertical threaded bore 304 extending from the top surface of the base member down into each bore 302, as shown. Bores 304 are threaded to receive a set screw 306, shown in FIG. 22.

Instead of bolt 118 being threadingly received in a pair of apertures, such as apertures 272 in base member 250, it is threadingly received in a threaded aperture 308 of a mounting pin 310. Pin 310 is sized to fit snugly yet slidingly within bore 302 without reaching the end of the bore Similarly, aperture 308 is sufficiently long that when bolt 118 extends through slot 176 it will cinch pin 310 tightly against holding member 104 without the bolt reaching the inside end of aperture 308.

Pin 310 has a partial circumferentially extending groove 312 having a tapered or angled wall 314. Set screw 306 has a chamfered tip 316 which engages grooved wall 314, as shown Pin 310 and wall 314 are structured so that the edges of chamfered tip 316 of screw 306 engages wall 314 without contacting the bottom of groove 312. This secures pin 310 in bore 302, and therefore tool holding member 104 against base member 280, as shown.

The use of the mounting pin and corresponding pin-receiving bores provides for a significant increase in the speed with which tool holding members 104 can be interchanged on base member 280. Pins 310 are left attached to the tool holding member by bolts 118 once a tool is mounted in it and adjusted for an appropriate position relative to base member 280. Instead of having to remove bolts 118 every time the tool holding member is replaced, this structure provides for a rapid mounting of tool holding member 104 onto the base member. Simply by a few turns of each set screw 06, the tool holding member is either released from or secured into the precise position for which it was set against the base member. The replacement of tools on base member 280, using this embodiment, can be performed within a time of several seconds.

It will be readily apparent that the structure of base member 280 just described is also applicable to base units similar to base unit 102 or a turret plate machined to directly receive tool holding members.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What I claim is:

1. In combination, a multi-station turret for a machine tool and at least one tool holding means for holding tools on said turret and for aligning the tools with a workpiece, said tool holding means including a base member attached to said turret, which base member has front and top surfaces, and at least one tool holding member removably attached to said base member and having top, front and rear surfaces, said tool holding means including cooperating mating portions on said base member and said tool holding member to fix relative horizontal movement therebetween while permitting relative vertical movement therebetween, one of said mating portions including means defining a groove having a pair of opposite sides with generally vertically extending faces and an associated substantially planar surface extending between and joining said opposite groove side faces, said groove side faces forming a pair of respective angles with said associated member surface when viewed in a horizontal plane which total at least 180°, the other of said mating portions having means defining a tongue having a corresponding pair of opposite sides with vertically extending faces and a corresponding associated substantially planar surface extending between and joining said opposite tongue side faces, and said tool holding member having means positioned thereon for adjustably setting the vertical positioning between said tool holding member and said base member;

wherein said tool holding means further includes elongate mounting means and means for fixedly attaching one end of said mounting means to said tool holding member with said mounting means extending away from said rear surface of said tool holding member, said base member further including a bore extending from said front surface of said base member into said base member for receiving said mounting means, and means for releasably securing said mounting means in said bore for receiving said mounting means; and wherein said means for releasably securing includes means defining an aperture in a side surface of said mounting means and a screw positionable in said aperture.

2. The combination as in claim 1 wherein said aperture and screw are relatively positioned for biasing said mounting means into said bore for receiving said mounting means when said mounting means is attached to said tool holding member.

* * * * *